United States Patent
Jiang

(10) Patent No.: US 9,380,069 B2
(45) Date of Patent: Jun. 28, 2016

(54) METHOD AND DEVICE FOR DATA TRANSMISSION

(71) Applicant: Huawei Technologies Co., Ltd., Shenzhen (CN)

(72) Inventor: Sheng Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 13/933,904

(22) Filed: Jul. 2, 2013

(65) Prior Publication Data

US 2013/0298231 A1     Nov. 7, 2013

Related U.S. Application Data

(63) Continuation of application No. PCT/CN2011/083592, filed on Dec. 7, 2011.

(30) Foreign Application Priority Data

Jan. 13, 2011   (CN) .......................... 2011 1 0006675

(51) Int. Cl.
*H04L 29/06*     (2006.01)
(52) U.S. Cl.
CPC ............ *H04L 63/1425* (2013.01); *H04L 63/08* (2013.01); *H04L 63/1441* (2013.01); *H04L 63/164* (2013.01); *H04L 69/16* (2013.01); *H04L 69/22* (2013.01)
(58) Field of Classification Search
CPC .............. H04L 63/1425; H04L 63/164; H04L 63/1441; H04L 63/08; H04L 69/16; H04L 69/22
See application file for complete search history.

(56) References Cited

U.S. PATENT DOCUMENTS

| 6,182,139 | B1 * | 1/2001 | Brendel | .............. H04L 29/06 709/201 |
| 2007/0233762 | A1 * | 10/2007 | Sudhakar | ............... G06F 7/582 708/250 |

(Continued)

FOREIGN PATENT DOCUMENTS

| CN | 101277194 A | 10/2008 |
| CN | 101640631 A | 2/2010 |

(Continued)

OTHER PUBLICATIONS

Written Opinion of the International Searching Authority issued in corresponding PCT Patent Application No. PCT/CN2011/083592, mailed Mar. 15, 2012, 8 pages.

(Continued)

*Primary Examiner* — Matthew Smithers
(74) *Attorney, Agent, or Firm* — Brinks Gilson & Lione

(57) ABSTRACT

Embodiments of the present disclosure provide a method and a device for data transmission. In the method, a network layer communication entity of a receiving device receives an IP packet from a sending device, where a header of the IP packet carries a random value corresponding to the sending device. The receiving device decapsulates the IP packet and obtains the random value carried in the header of the IP packet. The receiving device sends the random value to a transport layer communication entity of the receiving device so that the transport layer communication entity of the receiving device verifies the random value. The receiving device in embodiments of the present disclosure includes a receiving module, an obtaining module, and a verifying module.

15 Claims, 5 Drawing Sheets

(56) References Cited

U.S. PATENT DOCUMENTS

2010/0153706 A1* 6/2010 Haddad ............... H04L 63/0407
713/153
2011/0119534 A1* 5/2011 Liu ................... H04L 29/12915
714/48

FOREIGN PATENT DOCUMENTS

| CN | 101646074 A | 2/2010 |
| CN | 101848489 A | 9/2010 |
| CN | 102137096 A | 7/2011 |

OTHER PUBLICATIONS

International Search Report issued in corresponding PCT Patent Application No. PCT/CN2011/083592, mailed Mar. 15, 2012, 2 pages.
Office Action issued in corresponding Chinese Patent Application No. 201110006675.3, mailed May 9, 2013, 14 pages.
Office Action issued in corresponding Chinese Patent Application No. 201110006675.3, mailed Dec. 12, 2012, 8 pages.
Zhao et al., "General-purpose Identity Hiding Schemes for Ad-hoc Networks" 2009 International Symposium on Intelligent Ubiquitous Computing and Education, 2009, 4 pages.

* cited by examiner

| Option Type | Option Length | Random Value |

| Next Header | Extension Header Length | Random Value |

METHOD AND DEVICE FOR DATA TRANSMISSION

CROSS REFERENCE TO RELATED APPLICATIONS

This application is a continuation of International Patent Application NO. PCT/CN2011/083592, filed on Dec. 7, 2011, which claims priority to Chinese Patent Application No. 201110006675.3, filed on Jan. 13, 2011, both of which are hereby incorporated by reference in their entireties.

FIELD

The present disclosure relates to the field of data communication and, in particular, to a method and a device for data transmission in the field of data communication.

BACKGROUND

In network communication, security of data communication is becoming a focus of people's attention. Particularly, transport layer protocols such as Transmission Control Protocol (Transmission Control Protocol, "TCP" for short), User Datagram Protocol (User Datagram Protocol, "UDP" for short), Stream Control Transmission Protocol (Stream Control Transmission Protocol, "SCTP" for short), and Datagram Congestion Control Protocol (Datagram Congestion Control Protocol, "DCCP" for short) are vulnerable to off-path (off-path) attacks. Because off-path information is off the transmission path and beyond monitoring, the prior art can only reduce risks of being attacked by carrying a random value in a packet exchanged through a protocol. In this case, a data receiving device accepts only data in the packet that carries a correct random value. Therefore, an off-path attacker is unable to launch attacks effectively unless the attacker guesses or attempts the random value successfully in a very short time. Therefore, a larger number of significant bits of the random value bring greater difficulty to the attacker.

Currently, a transport layer protocol supports up to 32 bits of a significant random value. For example, a random value of a port is a significant random value of about up to 15 bits, and a serial number is a significant random value of about up to 17 bits. However, the number of bits of a random value is not enough for meeting the increasing computing capacity, and the available security protection is increasingly weaker. Besides, if each transport layer protocol is extended to increase the bits of the random value, the standardization workload is heavy, and the practice is not universally applicable.

SUMMARY

Therefore, the present disclosure provides a method and a device for data transmission to provide a significant random value of more bits for a transport layer, improve communication security, and be universally applicable to any transport layer protocol.

One aspect of the present disclosure provides a method for data transmission, including: receiving, by a network layer communication entity of a receiving device, an IP packet from a sending device, where a header of the IP packet carries a random value corresponding to the sending device; decapsulating the IP packet and obtaining the random value carried in the header of the IP packet; and sending the random value to a transport layer communication entity of the receiving device so that the transport layer communication entity of the receiving device verifies the random value.

Another aspect of the present disclosure provides a method for data transmission, including: receiving, by a network layer communication entity of a sending device, at least data from a transport layer communication entity of the sending device; encapsulating an IP packet according to the data, where a header of the IP packet carries a random value corresponding to the sending device; and sending the IP packet to a receiving device so that the receiving device can verify the random value carried in the header of the IP packet.

Another aspect of the present disclosure provides a receiving device for data transmission, including: a receiving module, configured to receive an IP packet from a sending device, where a header of the IP packet carries a random value corresponding to the sending device; an obtaining module, configured to decapsulate the IP packet and obtain the random value carried in the header of the IP packet; and a verifying module, configured to verify the random value obtained by the obtaining module.

Another aspect of the present disclosure provides a sending device for data transmission, including: a generating module, configured to generate a random value corresponding to the sending device; an encapsulating module, configured to encapsulate an IP packet, where a header of the IP packet carries the random value generated by the generating module; and a sending module, configured to send the IP packet to a receiving device.

Based on the foregoing solutions, the methods and the devices provided in the present disclosure carry a random value in a header of an IP packet, so as to provide an extra random value or a newly introduced random value for the transport layer of the receiving device, provide a significant random value of more bits for the transport layer, and thus improve communication security; moreover, because the random value is carried in the header of the IP packet, the method and the device are universally applicable to any transport layer protocol, and thus can improve communication security simply and efficiently without the need of extending transport layer protocols one by one.

BRIEF DESCRIPTION OF DRAWINGS

To describe the solutions in embodiments of the present disclosure more clearly, the following briefly introduces the accompanying drawing required for describing embodiments of the present disclosure. Apparently, the accompanying drawing in the following description illustrate merely some embodiments of the present disclosure, and persons of ordinary skill in the art may still derive other drawings from the accompanying drawing without creative effort.

DESCRIPTION OF EMBODIMENTS

The following describes the solutions in embodiments of the present disclosure clearly and comprehensively with reference to the accompanying drawings in embodiments of the present disclosure. Apparently, the described embodiments are merely a part rather than all embodiments of the present disclosure. All other embodiments obtained by persons skilled in the art based on embodiments in the present disclosure without creative efforts shall fall within the protection scope of the present disclosure.

Figures 1, 2, 3:
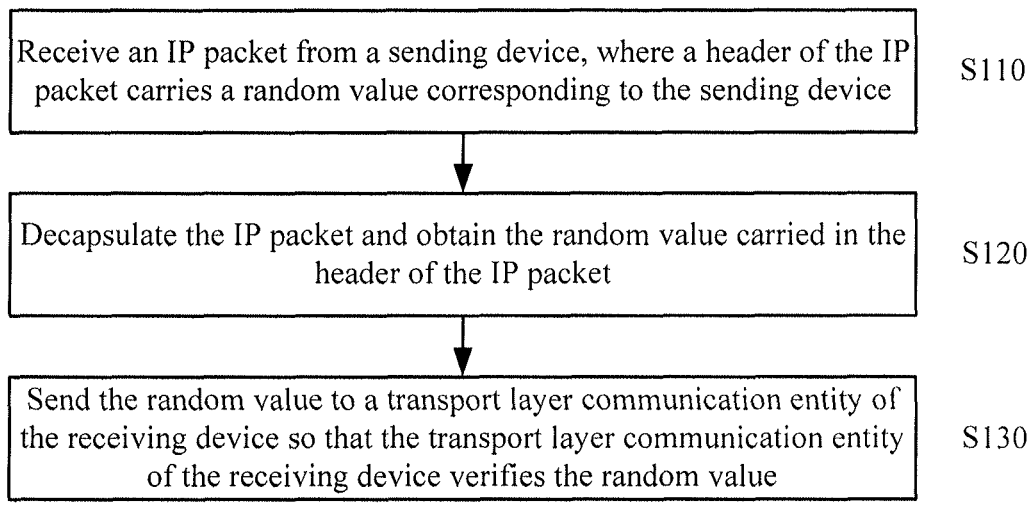
FIG. 1 is a schematic diagram of a method for data transmission according to an embodiment of the present disclosure.
FIG. 2 is a data structure of an extension header of an IP packet according to an embodiment of the present disclosure.
FIG. 3 is a data structure of another extension header of an IP packet according to an embodiment of the present disclosure.

FIG. 1 is a schematic diagram of a method for data transmission according to an embodiment of the present disclosure. The method is applicable to data transmission between a sending device and a receiving device. Either one of the sending device and the receiving device may be a server, a terminal device, a network device or a user equipment. As shown in FIG. 1, the method includes:

In S110, a network layer communication entity of a receiving device (hereinafter referred to as a "first communication entity") receives an IP packet from a sending device, where a header of the IP packet carries a random value corresponding to the sending device, In S120, the first communication entity decapsulates the IP packet and obtains the random value carried in the header of the IP packet.

In S130, the first communication entity sends the random value to a transport layer communication entity of the receiving device (hereinafter referred to as a "second communication entity") so that the second communication entity verifies the random value. Optionally, the first communication entity may be any program, application, and so on, that communicates in the network layer, and the second communication entity may be any program, application, and so on, that communicates in the transport layer.

The method in an embodiment of the present disclosure carries a random value in a header of an IP packet, so as to provide an extra random value or a newly introduced random value for the transport layer of a receiving device, and therefore, a second communication entity can perform verification by using a significant random value of more bits, and thus communication security is improved; moreover, because the random value is carried in the header of the IP packet, the method is universally applicable to any transport layer protocol, and thus improves communication security simply and efficiently without the need of extending transport layer protocols one by one.

Optionally, in the above embodiment, the random value carried in the header of the IP packet may be generated by a network layer communication entity of a sending device (hereinafter referred to as a "third communication entity") or may be generated by a transport layer communication entity of the sending device (hereinafter referred to as a "fourth communication entity"). The third communication entity and the fourth communication entity or other communication entities may generate the random value corresponding to the sending device according to a preset random function and a seed value. Persons skilled in the art can understand that the random value may be generated by using other methods well known in the art.

Optionally, the length of the random value may be fixed or not, or may be determined according to requirements of the transport layer protocol. In this way, a newly introduced random value of more bits can be provided for the transport layer of the receiving device. Persons skilled in the art can understand that the data part of the IP packet may carry a port number and a serial number. Therefore, the header of the IP packet can provide an extra random value for the transport layer of the receiving device, so that the second communication entity can perform verification by using a significant random value of more bits, and thus the communication security is improved.

In an embodiment of the present disclosure, the data transmission method carries a random value in a header of an IP packet, and therefore, the method is universally applicable to any transport layer protocol, and thus improves communication security simply and efficiently without the need of extending transport layer protocols one by one.

The following describes a data structure of an extension header of an IP packet applied to an embodiment of the present disclosure with reference to FIG. 2 and FIG. 3 respectively.

According to an embodiment of the present disclosure, a random value corresponding to a sending device may be carried in an option in a header of an IPv4 packet when an Internet Protocol version 4 (Internet Protocol version 4, "IPv4" for short) is applied. As shown in FIG. 2, an Option Type indicates that the current option carries a random value, and an Option Length indicates the length of a Random Value, where the Random Value carries the random value. Nevertheless, persons skilled in the art may define data structures of other forms. For example, the entire option may be used to carry the random value.

According to another embodiment of the present disclosure, a random value may be carried in an extension header of an IPv6 packet when an Internet Protocol version 6 (Internet Protocol version 6, IPv6 for short) is applied. For example, the extension header of an IPv6 packet may be in a format shown in FIG. 3. In this format, a Next Header may be used to point to a next extension header or point to a start position of a significant data payload, an Extension Header Length may indicate the length of the current extension header, and a Random Value may be used to carry a random value. Nevertheless, persons skilled in the art may define other formats according to actual conditions. For example, the extension header has only a Next Header and a Random Value of a fixed length.

Optionally, in an embodiment of the present disclosure, verifying the random value by the second communication entity may be: the second communication entity compares the random value carried in the header of the received IP packet with a predetermined verifying random value. The verifying random value may be a random value determined by the second communication entity in a preset mode. For example, when the second communication entity and the fourth communication entity communicate through a connected transport layer protocol such as TCP, a verifying random value accepted by both communication entities may be predetermined when creating a TCP connection. When the second communication entity and the fourth communication entity communicate through a connectionless transport layer protocol such as UDP, a verifying random value corresponding to a session may be determined according to random values in multiple packets included in the session. Nevertheless, persons skilled in the art may predetermine the verifying random value by other means such as an additional negotiation process.

If the second communication entity determines that the random value carried in the header of the received IP packet is different from the predetermined verifying random value, it indicates that the random value verification fails. In this case, the second communication entity may discard a data part of the IP packet, or may handle the data part as a suspicious attack subsequently. On the other hand, if the second communication entity determines that the random value carried in the header of the received IP packet is the same as the predetermined verifying random value, it indicates that the random value verification succeeds. In this case, the second communication entity may accept the data part of the IP packet. Persons skilled in the art can understand that when the data part of the IP packet carries a port number and a serial number, the second communication entity may perform corresponding random value verifications for the port number and the serial number.

Nevertheless, persons skilled in the art may verify the random value in other ways, for example, by checking whether the random value complies with a specific random value generation function, and so on.

In the method according to an embodiment of the present disclosure, a random value is carried in a header of an IP packet so that an extra random value or a newly introduced random value is provided for the transport layer of a receiving device, and thus a significant random value of more bits is provided for the transport layer, thereby improving communication security. Moreover, because the random value is carried in the header of the IP packet, the method is universally applicable to any transport layer protocol, and thus improves communication security simply and efficiently without the need of extending transport layer protocols one by one.

Figure 4:
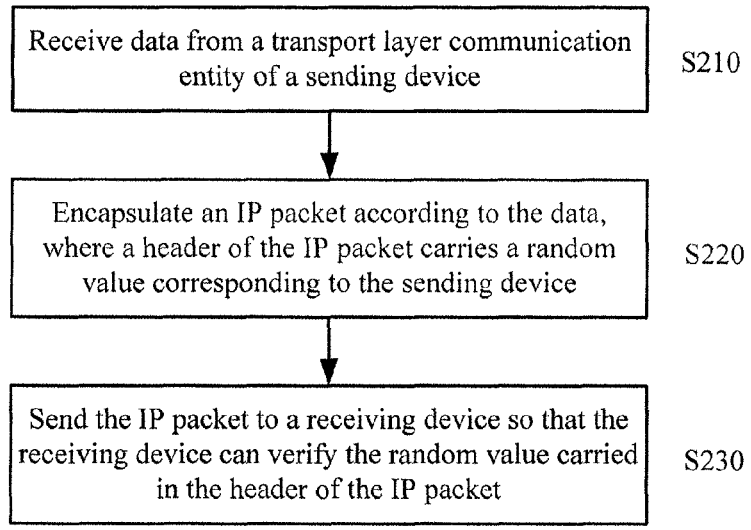
FIG. 4 is a schematic diagram of a method for data transmission according to another embodiment of the present disclosure.

FIG. 4 is a schematic diagram of a method for data transmission according to another embodiment of the present disclosure. As shown in FIG. 4, the method includes:

In S210, a third communication entity receives at least data from a fourth communication entity. The data includes protocol data units of a transport layer. From a perspective of a network layer, the protocol data units of the transport layer are also service data units of the network layer. Optionally, the data may further include other parameters for communication between the third communication entity and the fourth communication entity.

In S220, the third communication entity encapsulates the received data into an IP packet, where a header of the IP packet carries a random value corresponding to the sending device.

In S230, the third communication entity sends the IP packet to a receiving device so that a transport layer communication entity of the receiving device (that is, a second communication entity) can verify the random value.

In an embodiment of the present disclosure, the random value carried in the header of the IP packet may be generated by the third communication entity or by the fourth communication entity. When the random value is generated by the fourth communication entity, the data received by the third communication entity from the fourth communication entity includes not only the protocol data units of the transport layer, but also the random value generated by the fourth communication entity. When the random value is generated by the third communication entity, the third communication entity may generate the random value according to the received data. In this case, the data sent by the fourth communication entity to the third communication entity includes the protocol data units of the transport layer and may further include parameters required for generating the random value by the third communication entity.

In the method according to an embodiment of the present disclosure, a random value is carried in a header of an IP packet when the IP packet is encapsulated. Therefore, an extra random value or a newly introduced random value is provided for the transport layer of a receiving device, and a significant random value of more bits is provided for the transport layer, thereby improving communication security. Moreover, because the random value is carried in the header of the IP packet, the method is universally applicable to any transport layer protocol, and thus improves communication security simply and efficiently without the need of extending transport layer protocols one by one.

Figure 5:
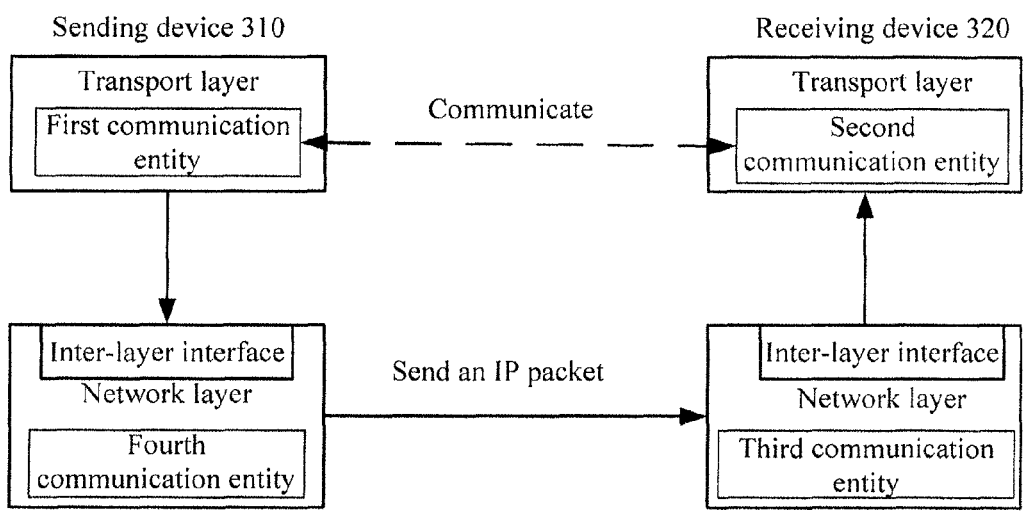
FIG. 5 is a flowchart of a method for data transmission according to another embodiment of the present disclosure.

The following describes a method for data transmission according to an embodiment of the present disclosure with reference to a scenario shown in FIG. 5. The method is applicable to data transmission between a sending device 310 and a receiving device 320.

As shown in FIG. 5, a first communication entity of the receiving device 320 receives an IP packet from the sending device 310, where a header of the IP packet carries a random value corresponding to the sending device 310. The first communication entity decapsulates the received IP packet and obtains the random value carried in the header of the IP packet, and sends the random value and a data part of the IP packet to a second communication entity of the receiving device 320 through an inter-layer interface. In an embodiment of the present disclosure, the inter-layer interface is an interface for transmitting data between a transport layer and a network layer.

Optionally, the second communication entity compares the random value with a predetermined verifying random value, and accepts the data part of the IP packet if the random value is the same as the verifying random value, or, discards the data part of the IP packet or handles the data part as a suspicious attack subsequently if the random value is different from the verifying random value. In this way, the random value is verified.

In the scenario shown in FIG. 5, the random value carried in the header of the IP packet may be generated by a third communication entity of the sending device 310 or by a fourth communication entity of the sending device 310.

If the random value is generated by the third communication entity, while sending data to the third communication entity through an inter-layer interface, the fourth communication entity also sends other parameters correlated with the generation of the random value to the third communication entity. In this way, the third communication entity can generate the random value according to the other parameters.

If the random value is generated by the fourth communication entity, while sending data to the third communication entity through an inter-layer interface, the fourth communication entity also sends the generated random value to the third communication entity.

The third communication entity performs IP encapsulation for the data sent by the fourth communication entity, and generates an IP packet, where a header of the IP packet carries a random value corresponding to the sending device 310, and then sends the IP packet to the receiving device 320. Persons skilled in the art should understand that in an actual sending process, the packet will be further processed on a data link layer and a physical layer that are lower layers, and such processing is not described herein.

In the method according to an embodiment of the present disclosure, a random value is carried in a header of an IP packet so that an extra random value or a newly introduced random value is provided for the transport layer of a receiving device, and thus a significant random value of more bits is provided for the transport layer, thereby improving communication security. Moreover, because the random value is carried in the header of the IP packet, the method is universally applicable to any transport layer protocol, and thus improves communication security simply and efficiently without the need of extending transport layer protocols one by one.

The following describes a receiving device and a sending device for data transmission according to embodiments of the present disclosure.

Figure 6:
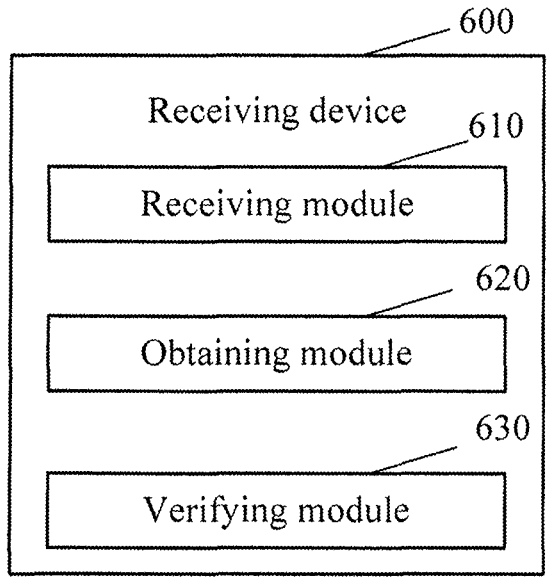
FIG. 6 is a structural block diagram of a receiving device according to an embodiment of the present disclosure.

FIG. 6 is a structural block diagram of a receiving device 600 according to an embodiment of the present disclosure. As shown in FIG. 6, the receiving device 600 includes a receiving module 610, an obtaining module 620, and a verifying module 630.

The receiving module 610 is configured to receive an IP packet from a sending device, where a header of the IP packet carries a random value corresponding to the sending device;

The obtaining module 620 is configured to decapsulate the IP packet and obtain the random value carried in the header of the IP packet; and The verifying module 630 is configured to verify the random value obtained by the obtaining module 620, and accept a data part of the IP packet if the random value is legal, or, discard the data part of the IP packet or handled the data part of the IP packet as a suspicious attack subsequently if the random value is not legal.

Figure 7:
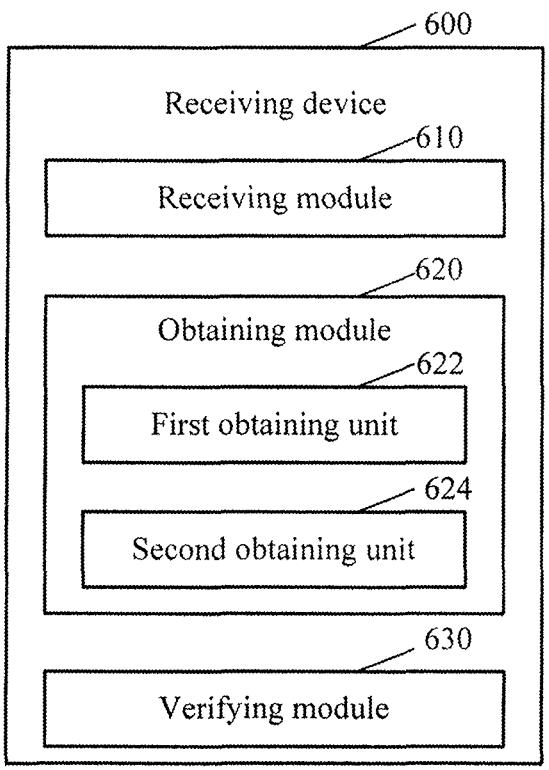
FIG. 7 is a structural block diagram of a receiving device according to another embodiment of the present disclosure.

Optionally, as shown in FIG. 7, the obtaining module 620 may further include:

a first obtaining unit 622, configured to obtain the random value from an option in the header of the IP packet, where the IP packet is an IPv4 packet; and/or a second obtaining unit 624, configured to obtain the random value from an extension header of the IP packet, where the IP packet is an IPv6 packet.

With the receiving device according to an embodiment of the present disclosure, a random value is carried in a header of an IP packet so that an extra random value or a newly introduced random value is provided for the transport layer of the receiving device, and thus a significant random value of more bits is provided for the transport layer, thereby improving communication security. Moreover, because the random value is carried in the header of the IP packet, the method is universally applicable to any transport layer protocol, and thus improves communication security simply and efficiently without the need of extending transport layer protocols one by one.

Figure 8:
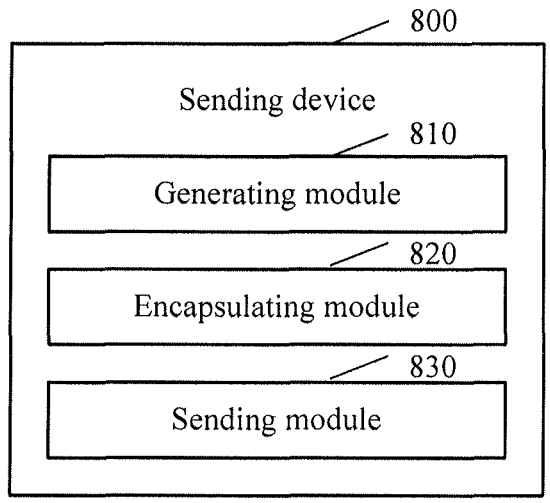
FIG. 8 is a structural block diagram of a sending device according to an embodiment of the present disclosure.

FIG. 8 is a structural block diagram of a sending device 800 according to an embodiment of the present disclosure. As shown in FIG. 8, the sending device 800 includes a generating module 810, an encapsulating module 820, and a sending module 830, The generating module 810 is configured to generate a random value corresponding to the sending device;

The encapsulating module 820 is configured to encapsulate an IP packet, where a header of the IP packet carries the random value generated by the generating module 810; and The sending module 830 is configured to send the IP packet to a receiving device.

Figure 9:
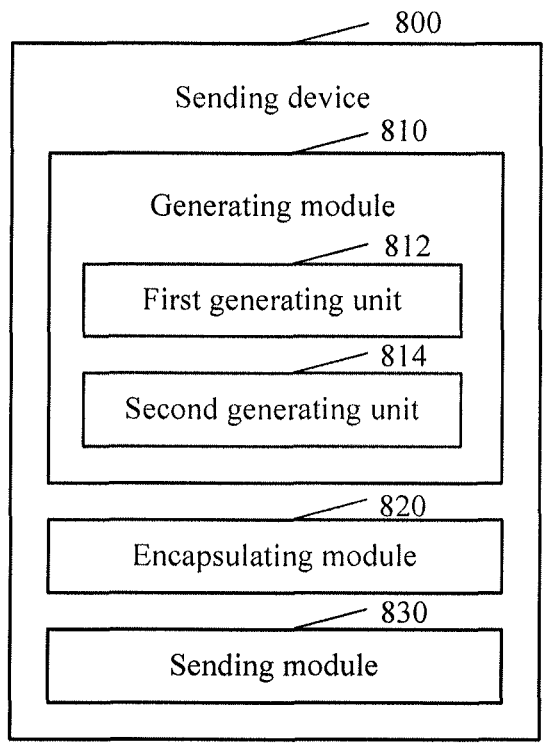
FIG. 9 is a structural block diagram of a sending device according to another embodiment of the present disclosure.

Optionally, as shown in FIG. 9, the generating module 810 may include:

a first generating unit 812, located in a transport layer communication entity of the sending device 800, and configured to generate a random value corresponding to the sending device; and/or a second generating unit 814, located in a network layer communication entity of the sending device 800, and configured to generate a random value corresponding to the sending device according to parameters provided by the transport layer communication entity of the sending device 800.

Figure 10:
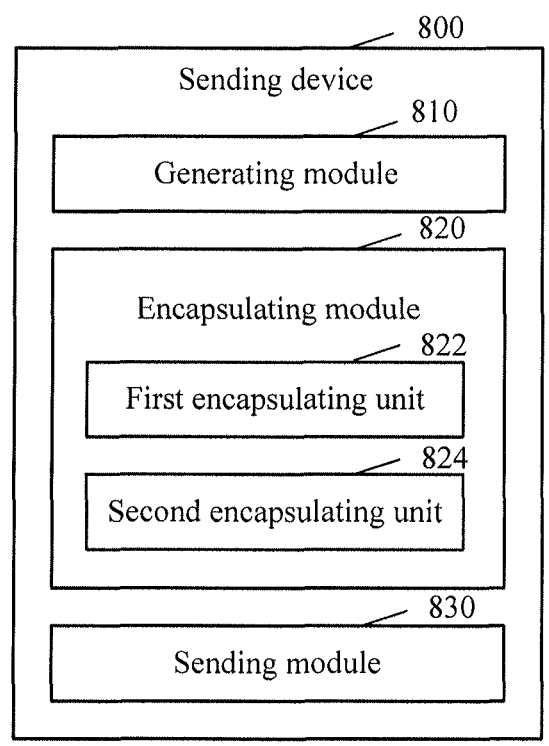
FIG. 10 is a structural block diagram of a sending device according to another embodiment of the present disclosure.

Optionally, as shown in FIG. 10, the encapsulating module 820 may include:

a first encapsulating unit 822, configured to encapsulate the random value generated by the generating module 810 into an option in the header of the IP packet, where the IP packet is an IPv4 packet; and/or a second encapsulating unit 824, configured to encapsulate the random value generated by the generating module 810 into an extension header of the IP packet, where the IP packet is an IPv6 packet.

With the sending device according to an embodiment of the present disclosure, a random value is carried in a header of an IP packet so that an extra random value or a newly introduced random value is provided for the transport layer of the receiving device, and thus a significant random value of more bits is provided for the transport layer, thereby improving communication security. Moreover, because the random value is carried in the header of the IP packet, the method is universally applicable to any transport layer protocol, and thus improves communication security simply and efficiently without the need of extending transport layer protocols one by one.

Persons skilled in the art will appreciate that the method steps and units described in connection with embodiments disclosed herein can be implemented as electronic hardware, computer software, or a combination thereof. To illustrate the interchangeability of hardware and software clearly, steps and composition of each embodiment have been described above generally in terms of their functions. Whether the functions are performed by hardware or software depends on particular applications and design constraint conditions of the solutions. Persons skilled in the art may use different methods to implement the described functions for each particular application, but such implementation shall not be deemed falling outside the scope of the present disclosure.

The method steps described in connection with embodiments disclosed herein may be implemented by hardware, or a software program executed by a processor, or a combination thereof. The software program may reside in a random access memory (RAM), an internal memory, a read-only memory (ROM), an electrically programmable ROM, electrically erasable programmable ROM, a register, a hard disk, a removable disk, a CD-ROM, or any other form of storage medium known in the art.

Although some embodiments of the present disclosure have been illustrated and described, persons skilled in the art should understand that various modifications may be made to the embodiments without departing from the principles of the disclosure. Such modifications shall fall within the protection scope of the present disclosure.

What is claimed is:

1. A method for data transmission, comprising:
receiving, by a network layer communication entity of a receiving device, an IP packet from a sending device, wherein a header of the IP packet carries a random value corresponding to the sending device, and wherein the random value corresponding to the sending device is generated by the sending device according to a preset random function and a seed value;
decapsulating the IP packet and obtaining the random value carried in the header of the IP packet; and
sending the random value to a transport layer communication entity of the receiving device so that the transport layer communication entity of the receiving device verifies the random value.

2. The method according to claim 1, wherein:
the random value corresponding to the sending device is generated by a network layer communication entity of the sending device.

3. The method according to claim 1, wherein:
the random value corresponding to the sending device is carried in an option in the header of the IP packet, wherein the IP packet is an IPv4 packet.

4. The method according to claim 1, wherein:
the verifying, by the transport layer communication entity of the receiving device, the random value comprises:
verifying whether the random value complies with a specific random value generation function.

5. The method according to claim 1, wherein:
the random value corresponding to the sending device is generated by a transport layer communication entity of the sending device.

6. The method according to claim 1, wherein:
the random value corresponding to the sending device is carried in an extension header of the IP packet, wherein the IP packet is an IPv6 packet.

7. The method according to claim 1, wherein:
the verifying, by the transport layer communication entity of the receiving device, the random value comprises:
comparing the random value with a predetermined verifying random value, and accepting a data part of the IP packet if the random value is the same as the verifying random value, or, discarding the data part of the IP packet or handling the data part as a suspicious attack subsequently if the random value is different from the verifying random value.

8. A data transmission method, comprising:
receiving, by a network layer communication entity of a sending device, at least data from a transport layer communication entity of the sending device;
encapsulating an IP packet according to the data, wherein a header of the IP packet carries a random value corresponding to the sending device, and wherein the random value corresponding to the sending device is generated by the sending device according to a preset random function and a seed value; and
sending the IP packet to a receiving device so that the receiving device can verify the random value carried in the header of the IP packet.

9. The method according to claim 8, wherein:
the network layer communication entity of the sending device further receives the random value generated by the transport layer communication entity of the sending device.

10. The method according to claim 8, wherein:
the network layer communication entity of the sending device further receives parameters from the transport layer communication entity of the sending device, wherein the parameters are required for generating the random value; and before encapsulating the IP packet according to the data, the method further comprises:
generating, by the network layer communication entity of the sending device, the random value according to the parameters.

11. A receiving device for data transmission comprising a processor and a non-transitory storage medium accessible to the processor, the non-transitory storage medium comprising:
a receiving module, configured to receive an IP packet from a sending device, wherein a header of the IP packet carries a random value corresponding to the sending device, and wherein the random value corresponding to the sending device is generated by the sending device according to a preset random function and a seed value;
an obtaining module, configured to decapsulate the IP packet and obtain the random value carried in the header of the IP packet; and
a verifying module, configured to verify the random value obtained by the obtaining module.

12. The receiving device according to claim 11, wherein the obtaining module comprises at least one of the following:
a first obtaining unit, configured to obtain the random value from an option in the header of the IP packet, wherein the IP packet is an IPv4 packet; and
a second obtaining unit, configured to obtain the random value from an extension header of the IP packet, wherein the IP packet is an IPv6 packet.

13. A sending device for data transmission comprising a processor and a non-transitory storage medium accessible to the processor, the non-transitory storage medium comprising:
a generating module, configured to generate a random value corresponding to the sending device;
an encapsulating module, configured to encapsulate an IP packet, wherein a header of the IP packet carries the random value generated by the generating module, and wherein the random value corresponding to the sending device is generated by the sending device according to a preset random function and a seed value; and
a sending module, configured to send the IP packet to a receiving device.

14. The sending device according to claim 13, wherein the generating module comprises at least one of the following:
a first generating unit, located in a transport layer communication entity of the sending device, and configured to generate the random value corresponding to the sending device; and
a second generating unit, located in a network layer communication entity of the sending device, and configured to generate the random value corresponding to the sending device according to parameters provided by the transport layer communication entity of the sending device.

15. The sending device according to claim 13, wherein the encapsulating module comprises at least one of the following:
a first encapsulating unit, configured to encapsulate the random value generated by the generating module into an option in the header of the IP packet, wherein the IP packet is an IPv4 packet; and
a second encapsulating unit, configured to encapsulate the random value generated by the generating module into an extension header of the IP packet, wherein the IP packet is an IPv6 packet.

* * * * *